United States Patent [19]
Ulrich

[11] Patent Number: 6,144,009
[45] Date of Patent: Nov. 7, 2000

[54] COMBINATION PUNCH PRESS AND LASER MACHINE

[75] Inventor: Johannes Ulrich, Furstenfeldbruck, Germany

[73] Assignee: Lillbacka Jetair OY, Kauhava, Finland

[21] Appl. No.: 09/246,128

[22] Filed: Feb. 8, 1999

[51] Int. Cl.$^7$ .................................................. B23K 26/38
[52] U.S. Cl. .............................. 219/121.67; 219/121.85
[58] Field of Search ........................... 219/121.6, 121.67, 219/121.72, 121.85

[56] References Cited

U.S. PATENT DOCUMENTS

| | | | |
|---|---|---|---|
| 4,201,905 | 5/1980 | Clark et al. ........................... | 219/121.6 |
| 4,335,296 | 6/1982 | Bredow ................................. | 219/121.67 |
| 4,833,292 | 5/1989 | Katayama . | |
| 4,873,418 | 10/1989 | Katayama . | |
| 4,889,968 | 12/1989 | Miyama et al. . | |
| 4,940,880 | 7/1990 | Klingel et al. . | |
| 4,950,861 | 8/1990 | Erlenmaier et al. ................. | 219/121.67 |
| 5,008,510 | 4/1991 | Koseki .................................. | 219/121.7 |

FOREIGN PATENT DOCUMENTS

| | | |
|---|---|---|
| 62-255036 | 11/1987 | Japan . |
| 1-71535 | 3/1989 | Japan . |
| 2-235590 | 9/1990 | Japan . |
| 2-241683 | 9/1990 | Japan . |
| 3-165985 | 7/1991 | Japan . |
| 10-6092 | 1/1998 | Japan . |

*Primary Examiner*—Gregory Mills
*Attorney, Agent, or Firm*—Louis Woo

[57] ABSTRACT

A combination punch press and laser machine has its punch press system and worktable mounted to one frame while its laser system mounted to another frame. The two frames are not in contact with each other, but are positioned such that a cantilever member of the frame whereon the laser system is mounted extends over the worktable so that the laser cutting head which is mounted to the end of the cantilever member superposes over a particular location of the worktable whereat the cutting of the worksheet by the laser beam is to be effected. This particular laser cutting location is positioned relative to the location of the worktable whereat the punching of the worksheet is to be effected by the pair of coacting upper tool and lower die of the punch press system. To prevent vibrations, be it resulting from impacts of the tool and die to the worksheet at the punching station or environmental vibrations, from affecting the accuracy of the positioning of the laser cutting head and damaging the laser cutting system, the frame on which the laser system is mounted is isolated from the floor by a number of rubber air springs which pressure is adjustably controlled by regulators. A number of safety supports that work in conjunction with the air springs prevent any collapse of the laser system frame in the unlikely event that the appropriate pressure is not maintained in the air pressure springs.

18 Claims, 4 Drawing Sheets

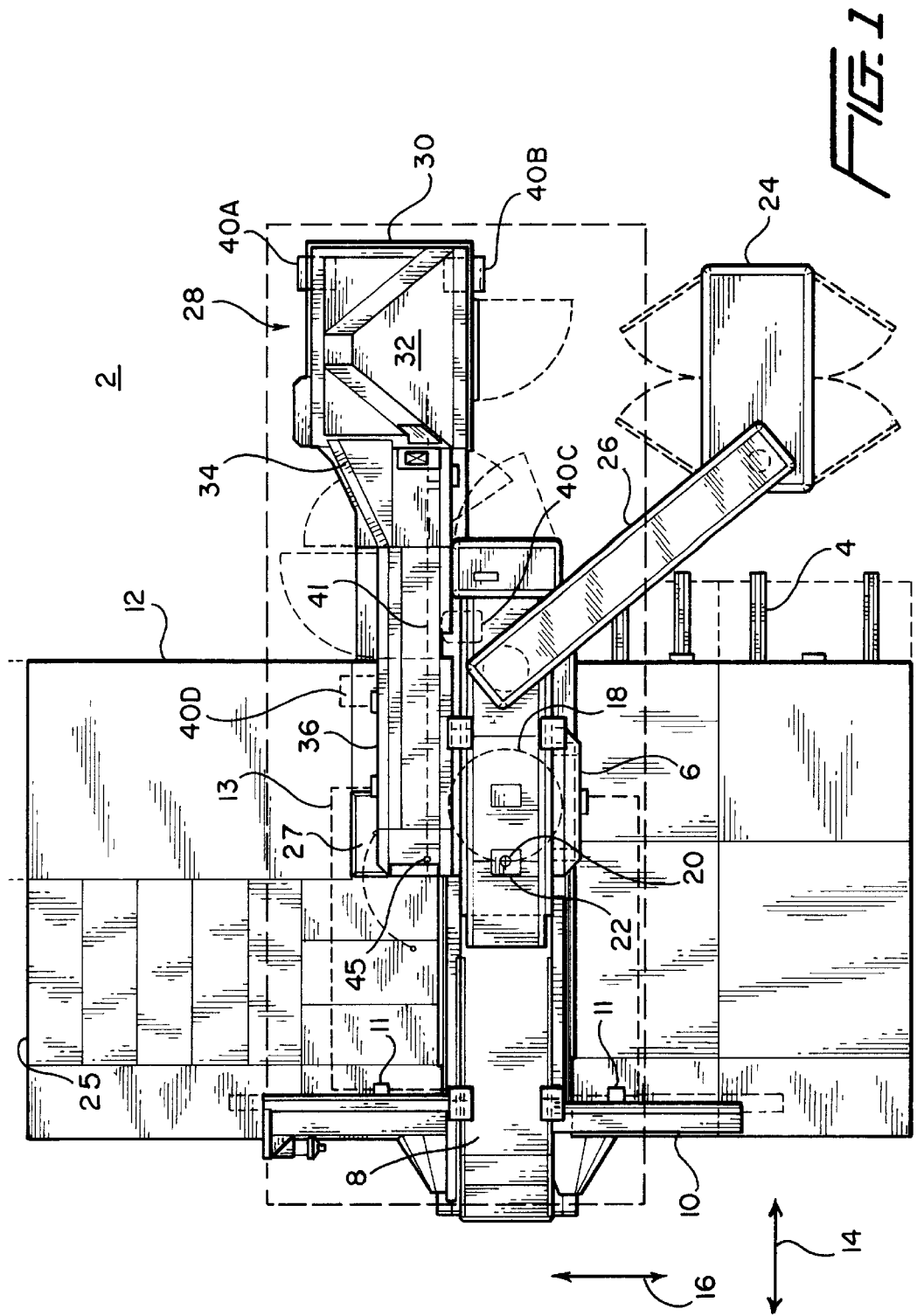

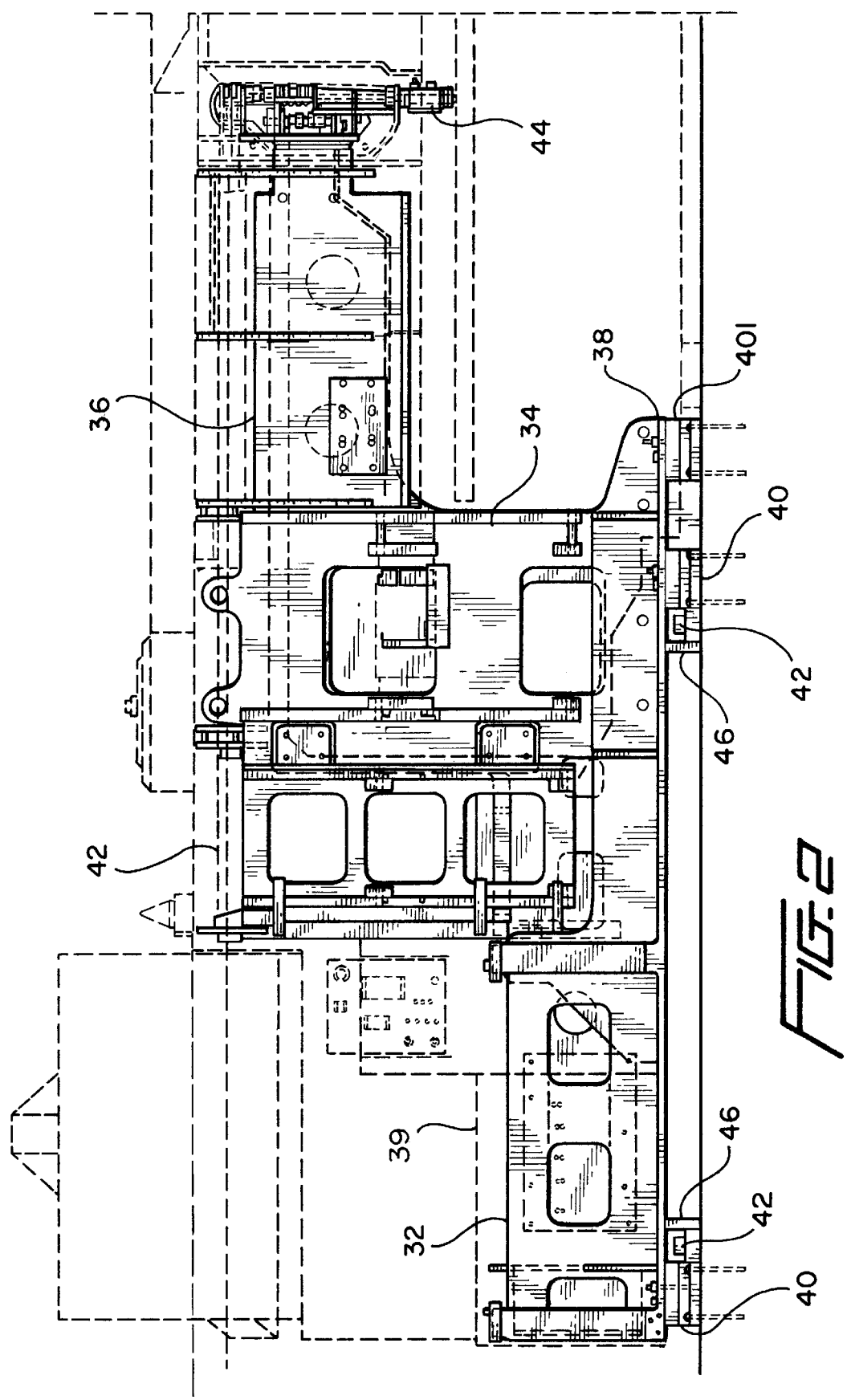

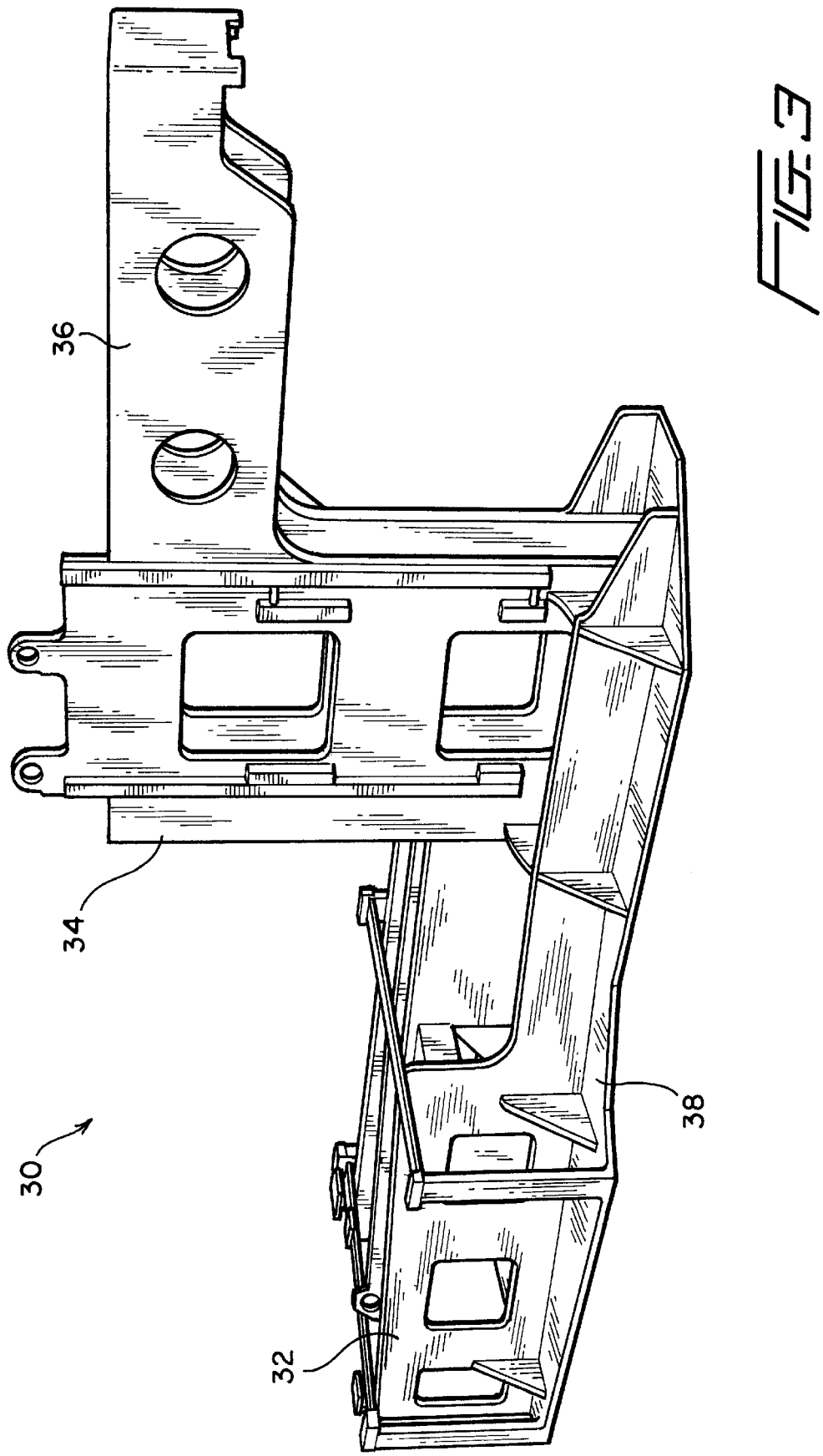

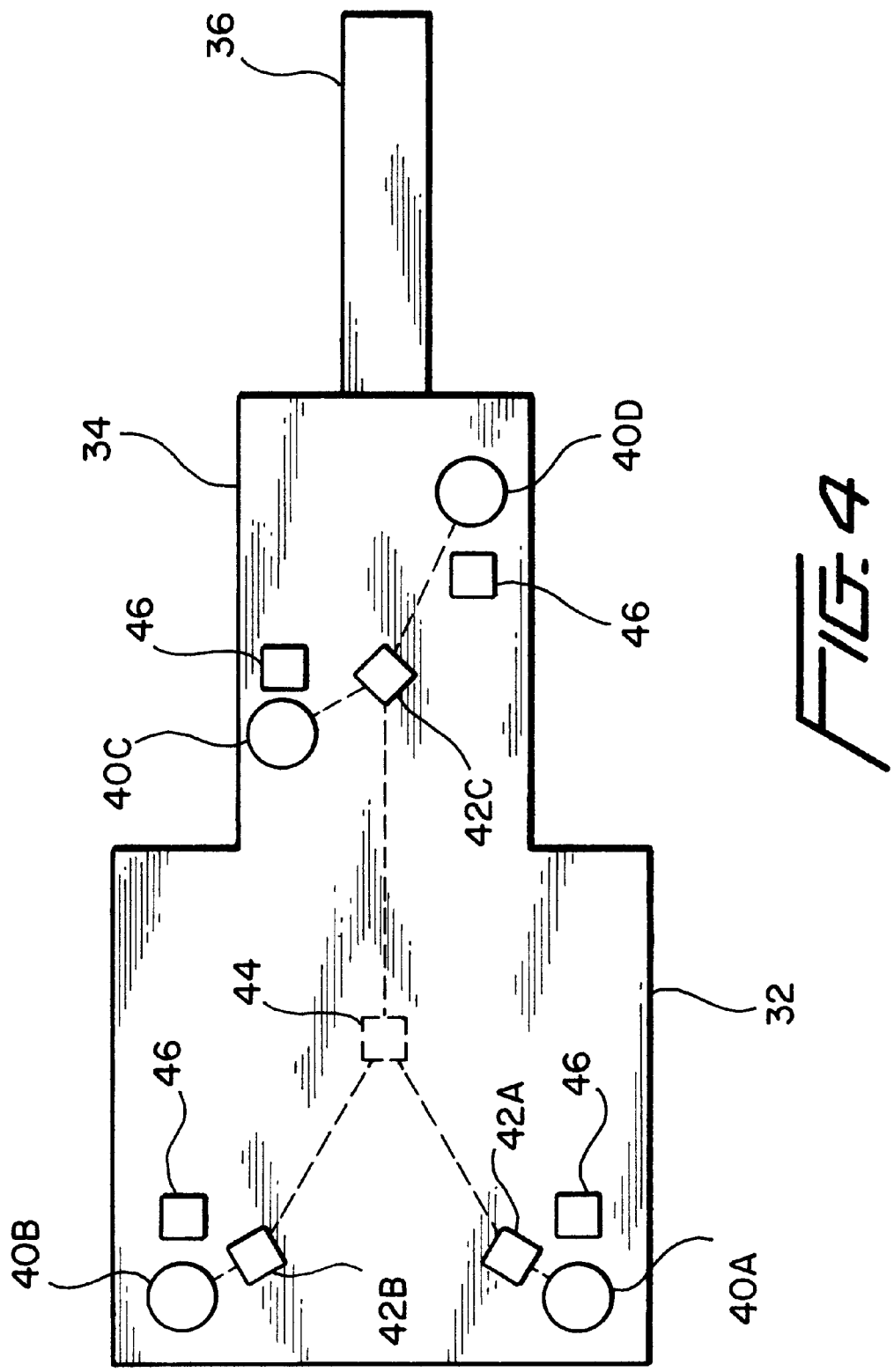

COMBINATION PUNCH PRESS AND LASER MACHINE

FIELD OF THE INVENTION

The present invention relates to a combination punch press and laser cutting machine, and particularly to a new scheme of isolating the laser cutting system from the punching system so that vibrations caused by punching would not affect the accuracy of the laser cutting.

BACKGROUND OF THE INVENTION

To effect cutting on a worksheet, the positioning of a laser cutting head relative to the worksheet has to be accurate. In a combination laser punch press machine, due to the vibrations caused by the punching of the worksheet, the positioning of the laser cutting head, not to mention the laser resonator (or generator), the beam guide and the beam bender, may become misaligned. There are a number of attempts to maintain the alignment of the laser cutting head with respect to the worksheet in a combination laser punch press machine. These are disclosed for example in U.S. Pat. Nos. 4,833,292, 4,873,418, 4,889,968 and 4,940,880.

In the '292 patent, to overcome the vibrations caused by the punching of the worksheet, the punch press and the worktable are provided on separate frames. And the laser system is placed on the same frame as the worktable. The problem with this system is that the worktable is movable. Further, the carriage and clamps that hold the workpiece and move the workpiece along the surface of the worktable also tend to create vibrations. As a consequence, the position of the laser cutting head of the laser of the '292 patent nonetheless is affected by the respective movements of the worktable and the worksheet thereon.

The '418 patent is a continuation-in-part of the '292 patent. It also discloses the placing of the laser system on the same frame as the moveable worktable.

For the combination laser punch machine disclosed in the '968 patent, the laser system is mounted on a vibration proof frame, which in turn is mounted on top of the frame where the turret punch press is mounted. To eliminate vibrations, a plurality of positioning support devices are interposed between the laser generator and the isolation support. Adjustment required for the laser system is rather complicated for the '968 machine.

The '880 patent likewise discloses a combination punch press and laser cutting machine. But the '880 machine is disclosed to have a C-shaped punch press frame and a platform extending at its rear portion to which the laser beam generator is mounted.

SUMMARY OF THE PRESENT INVENTION

To provide a simplified scheme of isolating critical vibrations from the laser cutting head and the other components of the laser system including but not limited to the laser generator or resonator, beam guide, and beam bender, the combination laser punch machine of the instant invention completely isolates the laser system from the punching system by mounting each of those systems in their respective frames. Further, the frame for the laser system is structured such that the laser cutting head is positioned to superpose over a particular location on the worktable relative to the working location of the punch press, so that the clamping mechanism which moves the worksheet on the worktable can accurately position the worksheet to the working location of the punch/die and the predetermined location underneath the laser cutting head. To isolate the critical vibrations that otherwise would have been transmitted to the laser frame via the floor to affect the alignment of the laser system, isolation mechanisms such as for example rubber air springs are provided to the base of the laser frame. These air springs can be regulated, either individually or in combination, to balance any uneven loads that may be placed on the laser frame.

By isolating the laser system completely from the punching system, the adjustment of the laser system, particularly the laser cutting head, with respect to the punching system, can easily be performed, since all positional calculations and adjustments could be made before the laser frame is aligned with the frame whereon the punching system and worktable are mounted.

By thus separating the punching system from the laser system, a punching system originally installed without any laser system can readily be retrofitted with a laser system to therefore become a combination laser punch system.

An objective of the present invention is therefore to provide a simple but yet effective scheme of combining a laser system with a punching system without suffering any degradation in the accuracy of the cutting by the laser system.

It is another objective of the present invention to provide a combination laser and punching machine which laser alignment can be readily adjusted independently of the punching system.

It is yet another objective of the present invention to enable an easy retrofitting of an existing punching press with a laser system.

BRIEF DESCRIPTION OF THE FIGURES

The above-mentioned objectives and advantages of the present invention will become apparent and the invention itself will best be understood by reference to the following description of an embodiment of the invention taken in conjunction with the accompanying drawings, wherein:

FIG. 1 is a plan view of the combination laser punch machine of the instant invention;

FIG. 2 is a side view of the laser system of the instant invention;

FIG. 3 is a perspective view of an exemplar frame for supporting the laser system of the instant invention; and FIG. 4 is a bottom view of the frame shown in FIG. 3 for illustrating the positioning of the isolation mechanisms of the instant invention.

DETAILED DESCRIPTION OF THE INVENTION

With reference to FIG. 1, the combination punch and laser machine 2 of the instant invention is shown to have one frame 4 onto which a turret punch press 6 is mounted. As is well known, an overhang 8 extends across frame 4 so that frame 4, when viewed from its side, is O-shaped. A carriage 10 to which is mounted a number of clamps 11 for grasping and holding a worksheet is movably mounted to frame 4. The worksheet is moved over a worktable 12. Insofar as carriage 10 is movable along the directions indicated by directional arrows 14 and clamps 11 are movable bidirectionally as indicated by directional arrows 16, worksheet 13 can be moved by the combination movements of carriage 10 and clamps 11 to any position on worktable 12.

Turret punch press 6 is shown to include a turret 18, which in actuality represents both an upper and a lower turret, that comprises at least one tool 20, which represents a coacting pair of upper tool and lower die. As is well known, turrets 18, both the upper and lower turrets, can rotate synchronously so as to position a selected pair of coacting upper and lower tools (among the plurality of coacting pairs) to a given working position, such as 22, for fabricating a worksheet, such as for example sheet 13.

To effect the movement of carriage 10, clamps 11, as well as controlling the operation and movements of turrets 18 and tools 20, a CNC controller 24, connected to the machine via a conduit 26, is used.

In addition to worktable 12 being mounted to frame 4, a conveyor 25 that conveys workpieces from the workstation 6 may also be mounted, or at least positioned relative, to frame 4. A chute 25 at worktable 12 further allows cut pieces to be dropped from worktable 12 to a container, or pallet, placed below worktable 12.

The combination laser punch machine of the instant invention also includes a laser system 28 mounted on another frame 30 that is separate from frame 4. As best shown in FIGS. 2 and 3, frame 30 comprises a unitary rigid frame having a base platform portion 32, an upright portion 34 that extends from platform 32, and a cantilever member portion 36 that extends from upright portion 34. Frame 30 is shown to have a base 38 to which a number of rubber air springs 40 are mounted. These air springs are rubber insulators pressurized by a fluid such as air to isolate frame 30 from shocks and vibrations. They may be obtained from the Bilz Company of Leonberg, Germany. In essence, air springs 40 act to insulate frame 30 from any critical vibrations, that could affect the alignment of the various components of the laser system, that would have otherwise transmitted thereto from the ground or floor onto which frame 30 is placed. More on that later.

Returning to frame 30, note that a laser system includes a laser generator or resonator, a laser cutting or processing head, and a laser guide that connects the laser generator to the laser cutting head so that the laser beam output from the laser generator may be routed to the laser cutting head. The laser beam bender and other components such as for example the telescopic optics in the laser that are not necessary for the understanding of this invention are not shown. Further, insofar as such laser cutting system and the way in which the generated laser beam is used to fabricate a worksheet is well known, no further discussion thereof is deemed necessary herein. For the instant invention, the laser resonator 39 is mounted onto platform 32, and the laser guide 41 is shown to be coupled to upright portion 34 and routed thereby across cantilever member 36 to laser cutting head 44.

With further reference to FIG. 1, it can be seen that frame 30 is positioned adjacent frame 4 in such a way that cantilever member 36 overhangs worktable 12 so that laser cutting head 44 is alignedly superposed over location 45. Note that location 46 is situated a predetermined distance from location 22, whereat punching of the worksheet takes place. The operation of the laser system, like that of the turret punch press, is controlled by CNC 24.

Given that cantilever member 36 runs parallel to the overhand carriage 8, and yet does not come into contact therewith, frame 30 therefore is isolated from frame 4. Accordingly, any critical vibrations that may be generated at frame 4 that could damage and affect the alignment of the laser cutting head (and the other components of the laser system with respect to each other), as a consequence for example due to the impacting of the worksheet by the tool and die and the movement of the worksheet by carriage 10, could only be transmitted to frame 30 by way of the floor on which frame 30 sits.

To ensure that frame 30 is not affected by such critical vibrations, as was noted earlier, a number of air springs 40 are mounted to the base of frame 30 to isolate vibrations and movements from the floor. Air springs 40 each include a fluid pressure chamber, usually filled with air, that acts as a shock absorber. The air is input/output from each air spring 40 by means of a vent (not shown) that is connected to a regulator 42. For the embodiment shown in FIG. 2, each of air springs 40a and 40b has connected thereto a regulator, namely 42a and 42b, respectively. See FIG. 4. The air springs 40c and 40d which support upright member 34, as best shown in FIG. 4, are each connected to a regulator 42c. With the type of regulators provided by the Bilz Company, the amount of air to be maintained in an air spring may be manually preset so that each regulator 42 may act as a control valve for maintaining the air pressure inside its corresponding air spring 40. In sum, air springs 40 in combination act to isolate frame 30 from any critical vibrations that would otherwise have been transmitted thereto from the floor where frame 30 is positioned. This is important insofar as the location of laser cutting head 44 with respect to worktable 12, at location 46, has to be precisely controlled, in order to provide accurate fabrication of the worksheet by a laser beam.

By thus isolating frame 30 from any damaging critical vibrations including environmental vibrations that could be transmitted from the floor, the position of laser cutting head 44 remains constant with respect to location 46 on worktable 12. This is so because the fabrication of a worksheet usually is done one at a time by either the punch/die or the laser cutting head. Thus, when the worksheet is being fabricated by the laser cutting head, it is presumed that it is not being worked on by the punch/die. Conversely, when the punch/die are in operation so that the worksheet is constantly being impacted, the critical vibrations resulting from the impacts would not cause any damage to the components of the laser system or deleteriously affect the accuracy of the positioning of the laser cutting head insofar as those vibrations would not be transmitted to isolated frame 30.

Further with reference to FIG. 4, note that in place of individual regulators for separately controlling the cushioning pressure of the air springs, a single regulator may also be used. Moreover, the operation of the plurality of air springs 40, and regulators 42, may be monitored by sensors (not shown) so that a processor, such as for example 44, may be used for monitoring the cushioning effectiveness of the air springs and for controlling the operation of the respective regulators to thereby achieve the maximal cushioning effect for frame 30 for enhancing the isolation of vibrations therefrom. In addition to insulate frame 30 from vibrations, such centralized control of the various air springs is also useful for preventing uneven loading conditions on frame 30. Putting it differently, processor 44, along with the various senors, would act as a level controller system for regulating the respective pressures in the various air springs so as to respond to any uneven loads that may be placed against any portion of frame 30 or by a floor that is not level, to thereby maintain the frame in a balanced condition.

To act as a back-up in the event that there is a loss of pressure to air springs 40, situated proximate to each of the air springs is a safety support 46. Each of supports 46 is of a certain height so that even in the unlikely event that there is a complete loss of pressure in air springs 40, frame 30 nonetheless would not come into contact with the floor. In other words, frame 30 would be supported by safety supports 46 until the pressure in the malfunctioning air spring is restored. The length of each of the safety supports 46 may be controlled by, and respond to, the amount of pressure in the air spring to which it is associated.

While a preferred embodiment of the present invention is disclosed herein for purposes of explanation, numerous changes, modifications, variations, substitutions, and equivalents in whole or in part should now be apparent to those skilled in the art to which the invention pertains. Accordingly, it is intended that the instant invention be limited only by the spirit and scope of the hereto appended claims.

What is claimed is:

1. A combination punch press and laser machine, comprising:
    at least one pair of coacting punch and die mounted to one frame;
    a worktable;
    clamping means for holding and moving a worksheet on said worktable;
    an other frame positioned adjacent said one frame and having a cantilever member extending over said worktable;
    a laser cutting system mounted to said other frame;
    a laser cutting head of said laser cutting system mounted to said cantilever member so as to be in alignment with and superposed over a particular location on said worktable; and
    cushioning means with the amount of cushion provided thereby being regulated for supporting said other frame, preventing uneven loading conditions of said other frame, and isolating said other frame from said one frame to thereby ensure that said laser cutting head remains in alignment with said particular location irrespective of the amount of impact and critical vibrations occurring at said one frame resulting from at least the fabrication of said worksheet by said pair of punch and die at said one frame.

2. Machine of claim 1, wherein said cushioning means comprises:
    a plurality of regulated air springs adjustable for effecting maximal isolation for said other frame; and
    wherein said other frame is a rigid unitary frame for enhancing isolation of said other frame from vibrations emanating from said one frame and environmental vibrations.

3. Machine of claim 2, wherein there are at least two air springs for supporting said platform and at least two other air springs for supporting a base of said other frame, wherein said cushioning means further comprises:
    one regulator coupled to each of said air springs supporting said base of said other frame for regulating the amount of air input to said each air spring to thereby regulate the pressure of said each air spring for cushioning and isolating said other frame from vibrations of said one frame and environmental vibrations;
    wherein, by controllably adjusting said regulators, said other frame is cushioned from a floor where it is positioned to therefore insulate it from vibrations and impacts that otherwise would have been transmitted thereto from the floor.

4. Machine of claim 3, further comprising:
    a processor controller for monitoring the operation of said regulators and controllably adjusting said regulators to control the amount of pressure to be applied to said regulators to thereby maintain a maximal cushioning effect and vibration isolation for said other frame.

5. Machine of claim 2, further comprising:
    a plurality of safety supports each working cooperatively with a corresponding one of said air springs to support said other frame and to prevent said other frame from flattening said one air spring in the event the air pressure in said one air spring is insufficient to support said other frame.

6. Machine of claim 2, wherein said cushioning means further comprises:
    a level controller system for regulating the respective air pressures in said air springs in response to any uneven loads to said other frame to thereby maintain said other frame in a balanced condition.

7. Machine of claim 1, wherein said one frame is an O-shaped frame; and
    wherein said other frame comprises a platform, an upright member extending from said platform, and said cantilever member extending from a top portion of said upright member, said cantilever member being aligned next to said O-shaped frame and said platform being positioned away from said O-shaped frame.

8. Machine of claim 1, wherein said laser cutting system comprises:
    a laser beam generator mounted to said other frame;
    an optical beam pathway for guiding the laser beam output from said laser beam generator to said laser cutting head; and
    wherein said punch and die are respective tools of an upper turret and a lower turret of a turret punch press.

9. Machine of claim 1, further comprising:
    processor controller for controlling the movement of said clamping means to position said worksheet on said worktable with reference to a given location and said particular location for fabrication by said pair of punch and die and said laser cutting head, respectively.

10. A method of isolating a laser cutting system from a punching system in a combination laser and punch press machine, comprising the steps of:
    a) mounting at least one pair of coacting punch and die to one frame;
    b) movably coupling clamping means to a worktable, said clamping means holding and moving a worksheet on said worktable;
    c) positioning an other frame adjacent said one frame, said other frame having a cantilever member extending over said worktable;
    d) mounting a laser cutting system to said other frame;
    e) mounting a laser cutting head of said laser cutting system to said cantilever member to be in alignment with and superposed over a particular location on said worktable; and
    f) providing cushioning means with the amount of cushion provided thereby being regulated to the underside of said other frame for supporting said other frame and preventing uneven loading of said other frame so as to ensure that said laser cutting head remains in alignment with said particular location irrespective of the amount of impact and vibrations occurring at said one frame.

11. Method of claim 10, wherein said other frame is a rigid unitary frame, and wherein said step f further comprises the steps of:
    providing a plurality of air springs to said other frame; and regulating the pressure in said air springs to obtain maximal cushioning for said other frame for enhancing isolation of said other frame from environmental vibrations and vibrations emanating from said one frame.

12. Method of claim 11, further comprising the step of:

utilizing a processor controller to automatically monitor the operation of said air springs and regulate the pressure in said air springs.

13. Method of claim 11, further comprising the step of:

providing a plurality of safety supports each working cooperatively with a corresponding one of said air springs to support said other frame and to prevent said other frame from flattening said one air spring in the event the air pressure in said one air spring is insufficient to support said other frame.

14. Method of claim 10, wherein said one frame is an O-shaped frame and said other frame comprises a platform, an upright member extending from said platform, and said cantilever member extending from the top portion of said upright member, wherein said step d further comprises the steps of:

aligning said cantilever member next to said O-shaped frame; and positioning said platform away from said O-shaped frame.

15. Method of claim 10, wherein said step e further comprises the steps of:

mounting a laser beam generator to said other frame; and guiding the laser beam output from said laser beam generator to said laser cutting head via an optical beam pathway positioned relative to said other frame.

16. Method of claim 10, wherein said step f further comprises the steps of:

providing a plurality of air springs for supporting a base of said other frame;

coupling one regulator to each of said air springs supporting said base for regulating the amount of air input to said each air spring to thereby regulate the pressure of said each air spring for cushioning and isolating said other frame from vibrations of said one frame and environmental vibrations; and controllably adjusting said regulators for cushioning said other frame from a floor where said other frame is positioned to therefore insulate said other frame from vibrations and impacts that otherwise would have been transmitted thereto from the floor.

17. Method of claim 16, further comprising the step of:

using a processor controller to automatically control the operations of said regulators.

18. Method of claim 16, further comprising the step of:

regulating the respective air pressures in said sir springs in response to any uneven loads to said other frame to thereby maintain said other frame in a balanced condition.

* * * * *